United States Patent [19]

Fujiwara et al.

[11] 4,013,911

[45] Mar. 22, 1977

[54] DISPLACEMENT - ELECTRICITY TRANSDUCER

[75] Inventors: Hideo Fujiwara, Tachikawa; Yukio Ichinose; Kenji Kato, both of Kokubunji, all of Japan

[73] Assignee: Hitachi, Ltd., Japan

[22] Filed: Oct. 21, 1974

[21] Appl. No.: 516,806

[30] Foreign Application Priority Data

| | | |
|---|---|---|
| July 22, 1974 | Japan | 49-83179 |
| July 24, 1974 | Japan | 49-84182 |
| Oct. 19, 1973 | Japan | 48-116842 |

[52] U.S. Cl. .............. 340/199; 340/196; 310/168; 324/34 PS; 318/658

[51] Int. Cl.[2] .............. H02P 13/10

[58] Field of Search .......... 340/196, 199; 318/658; 324/34 PS; 323/51; 310/168, 103, 105

[56] References Cited

UNITED STATES PATENTS

| | | | |
|---|---|---|---|
| 3,477,027 | 11/1969 | Jablonski | 340/199 X |
| 3,820,094 | 6/1974 | Mouri | 340/199 |
| 3,890,516 | 6/1975 | Wibbowson | 310/111 |

*Primary Examiner*—John W. Caldwell
*Assistant Examiner*—William M. Wannisky
*Attorney, Agent, or Firm*—Craig & Antonelli

[57] ABSTRACT

A displacement - electricity transducer contains a movable magnetic core and a fixed magnetic core oppositely arranged so as to have predetermined gaps or clearances in at least two places. Two substantially closed magnetic circuits, each including one of the gaps, are formed by both magnetic cores, so that when the movable magnetic core is displaced relative to the fixed magnetic core while maintaining a predetermined spacing therefrom, the substantially opposite area of the gap portion in one of the magnetic circuits increases, while the substantially opposite area of the gap portion in the other magnetic circuit decreases. A first coil is wound around a part common to the two magnetic circuits, while a second coil is wound around a part not common thereto. By applying an alternating current to the first coil, an output responsive to the displacement of the movable magnetic core is derived from the second coil.

53 Claims, 27 Drawing Figures

DISPLACEMENT - ELECTRICITY TRANSDUCER

BACKGROUND OF THE INVENTION

1. Field of the Invention

The present invention relates to a device for converting a mechanical displacement into an electric signal. More particularly, it relates to a displacement - electricity transducer which can simply detect a displacement at a very high sensitivity over a long term of use even where, as in the throttle valve of an automobile, a transport plane, or the like, the angular displacement is large and service temperature conditions are severe.

2. Description of the Prior Art

In recent years, with the growth of the automobile industry, the exhaust gas emitted from the automobile engine has caused a serious social problem as a source of environmental hazards. Therefore, a tendency has been seen to control the exhaust gas by any method such as a catalytic method. Regulation by legislation has also been considered in earnest. As a radical expedient, however, the development of a clean engine is necessary. It is believed the first essential to make the exhaust gas clean is to control the combustion within the engine.

To this end, a variety of engines are being developed and put into practical use as "clean" engines. These engines are not perfect, however. In order that the combustion explosion itself may be controlled so as to always keep the exhaust gas perfectly clean, it is necessary to further adopt a centralized control system based on an electronic circuit including a mini-computer.

That is, the prime aim of the future auto development will be to make it possible that all the sections of an automobile are electronically subject to centralized automatic control. In order to maintain the engine in the optimum state as a part of the means for achieving the aim, there has been a strong demand for an electronic detector which monitors and controls fuel injection and the air intake controlled of the engine. In other words, there has been a strong demand for a device which precisely detects the displacement of the throttle valve for regulating the fuel and air quantities in the automobile engine.

Automobiles are used over extensive regions from cold to tropical climates. Further, the difference between temperatures at starting and at a steady running of the engine is large, and the service temperature range is as wide as from −40° C. to +120° C. The conditions of the service environment are naturally extremely severe irrespective of bad roads, dust, rain, snow etc. Accordingly, the displacement detector for automobile engines must be a structure which satisfactorily takes the thermal resistance, vibration resistance, moisture resistance corrosion resistance etc. into consideration and must simultaneously be a structure which is capable of a high sensitivity detection of the displacement. Moreover, the displacement detector must be structurally simple in order to be inexpensive in production and must be durable in order to repeatedly detect, for several million times, the displacements which vary frequently on account of use.

As a principal device of the displacement - electricity transducer fulfilling the above requisites, a variable inductor has been proposed which comprises a movable magnetic core and a fixed magnetic core oppositely arranged so as to have prescribed gaps in at least two places, both magnetic cores substantially forming two magnetic circuits each including one gap, coils being wound around parts of the respective magnetic circuits, so that when the movable magnetic core is relatively displaced, while being held at a predetermined spacing with respect to the fixed magnetic core, the substantially opposite area of the gap portion in one magnetic circuit increases, while the substantially opposite area of the gap portion in the other magnetic circuit decreases. (copending U.S. Pat. application Ser. No. 485,626, commonly assigned).

In the variable inductor, however, the magnetic reluctance of the magnetic core is not perfectly negligible in comparison with that of the gap, and the exciting coil is wound around a part not common to the two magnetic paths. For these reasons, a third magnetic path, other than the two magnetic paths, is formed, and mutual induction between the respective magnetic path arises, and, although slight is a problem.

SUMMARY OF THE INVENTION

An object of the present invention is to provide a displacement - electricity transducer which eliminates the problem of the prior art and which can convert a displacement into an electrical signal by a simple construction.

More concretely, an object is to provide a displacement - electricity transducer which can detect a displacement at a very high sensitivity over a long term of use under conditions of large angular displacements and a wide range of service temperatures, and which is free from the influence of the mutual induction between the respective magnetic paths constituting the detector.

The displacement - electricity transducer of the present invention for accomplishing this object is characterized by a movable magnetic core and a fixed core oppositely arranged so as to have predetermined gaps in at least two places. Both magnetic cores form substantially two magnetic circuits each including one gap, a first coil being wound around a part common to the two magnetic circuits, at least one second coil being wound around a part not common to the two magnetic circuits, so that when the movable magnetic core is displaced relative to the fixed magnetic core as the spacing of the gap portion is held constant, the substantial opposite area of the gap portion in one of the magnetic circuits increases, while the substantial opposite area of the gap portion in the other magnetic circuit decreases. An A.C. supply voltage is applied across both terminals of the first coil so as to derive the terminal voltage of the second coil.

The other objects and features of the present invention will be apparent from the following detailed description when read in conjunction with the accompanying drawings.

BRIEF DESCRIPTION OF THE DRAWINGS

FIG. 4 is a view showing a modification of a fixed magnetic core in the embodiment of FIG. 1, while

FIG. 23 is a sketch of another embodiment of the present invention, while

DETAILED DESCRIPTION

Figure 1:
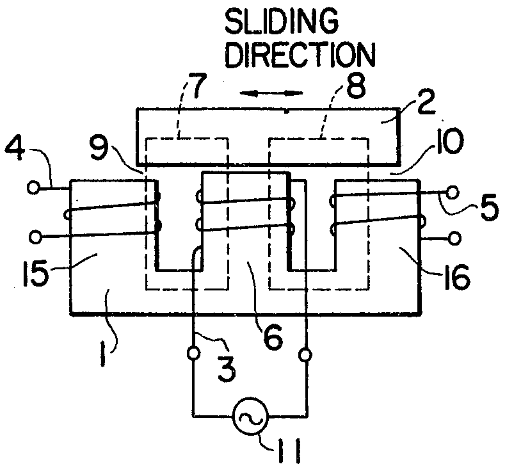
FIG. 1 is a side view of an embodiment of the present invention.

An embodiment of the present invention will be described in connection with FIGS. 1 and 2. In the figures, reference numerals 1 and 2 designate a fixed magnetic core and a movable magnetic core made of a material of high permeability, respectively. The movable magnetic core 2 is displaced in the direction of the arrow while maintaining the width of the gaps 9 and 10 constant. The primary coil 3 is wound around a central columnar part 6 of the fixed magnetic core 1, while the secondary coils 4 and 5 are wound around columnar parts 15 and 16 at both ends of the fixed magnetic core 1. Numerals 7 and 8 indicate magnetic paths. The voltage of an A.C. power source 11 is applied across the terminals of the primary coil 3.

Let $l_1$ and $l_2$ denote the effective magnetic path lengths of the magnetic paths 7 and 8, $S_l$ and $\mu$ denotes the mean cross-sectional area and the permeability of the magnetic cores, $\mu_o$ and $g$ denote the permeability and the width of the gaps, $S_{g1}$ and $S_{g2}$ denote the substantially opposite areas between the movable magnetic core 2 and the fixed magnetic core 1 with the gaps 9 and 10 therebetween, N denote the number of turns of the primary coil 3, and $N_1$ and $N_2$ denote the numbers of turns of the secondary coils 4 and 5. Assuming that the movable magnetic core 2 is displaced in the direction of the arrow in close adherence to the central columnar part 6 of the fixed magnetic core 1, the magnetic reluctances $R_{G1}$ and $R_{G2}$ of the respective magnetic paths 7 and 8 become:

$$R_{G1} = \int \frac{dl}{\mu S} = \frac{l_1}{\mu S_l} + \frac{g}{\mu_0 S_{g1}} \quad (1)$$

$$R_{G2} = \frac{l_2}{\mu S_l} + \frac{g}{\mu_0 S_{g2}} \quad (2)$$

Using for the magnetic cores a high permeability material with which:

$$\frac{g}{\mu_0 S_{g1}} >> \frac{l_1}{\mu S_l}$$

$$\frac{g}{\mu_0 S_{g2}} >> \frac{l_2}{\mu S_l}$$

that is, $$\mu >> \mu_0 \frac{l_1 S_{g1}}{g S_l}, \mu_0 \frac{l_2 S_{g2}}{g S_l} \quad (3)$$

then, from Eqs. (1) and (2), $$R_{G1} \approx \frac{g}{\mu_0 S_{g1}} \quad (4)$$

$$R_{G2} \approx \frac{g}{\mu_0 S_{g2}} \quad (5)$$

Further, both the magnetic cores are formed so that, even when the movable magnetic core 2 is displaced relative to the fixed magnetic core 1, $$S_{g1} + S_{g2} = S_g$$

may always become constant. Then, the magnetic reluctance $R_G$ to which a magnetic flux interlinked with the primary coil 3 is subject is equal to the parallel connection consisting of the magnetic reluctances $R_{G1}$ and $R_{G2}$, and therefore becomes:

$$R_G \approx \frac{1}{\frac{1}{R_{G1}} + \frac{1}{R_{G2}}} = \frac{g}{\mu_0 (S_{g1} + S_{g2})} = \frac{g}{\mu_0 S_g} \quad (6)$$

Accordingly, the inductance L of the primary coil 3 becomes constant as follows:

$$L \approx \frac{N\Phi}{I} = \frac{N\frac{E_G}{R_G}}{I} = \frac{N\frac{NI}{R_G}}{I} = \frac{\mu_0 N^2 S_g}{g} \quad (7)$$

where I denotes a current flowing through the primary coil 3, and $E_G$ a magnetomotive force in the primary coil. Consequently, the input impedance of the primary coil 3 is not affected by the displacement of the movable magnetic core 2, and it is always constant. It is apparent from the above description that, in the device according to the present invention, the power source 11 does not suffer from any fluctuation by the displacement of the movable magnetic core 2.

Magnetic fluxes $\Phi_1$ and $\Phi_2$ passing through the respective magnetic paths 7 and 8 are:

$$\Phi_1 \approx \frac{E_G}{R_{G1}} = \frac{\mu_0 S_{g1}}{g} N I \quad (8)$$

$$\Phi_2 \approx \frac{E_G}{R_{G2}} = \frac{\mu_0 S_{g2}}{g} N I \quad (9)$$

Therefore, the output voltages $V_1$ and $V_2$ of the respective secondary coils 4 and 5 become:

$$V_1 \approx N_1 \frac{d\Phi_1}{dt} = \left(\frac{\mu_0 N}{g} \cdot \frac{dI}{dt}\right) \cdot N_1 S_{g1}$$

-continued $$= \frac{N_1 S_{g1}}{N S_g} V \quad (10)$$

$$V_2 \simeq N_2 \frac{d\Phi_2}{dt} = \left( \frac{\mu_0 N}{g} \cdot \frac{dI}{dt} \right) \cdot N_2 S_{g2}$$

$$= \frac{N_2 S_{g2}}{N S_g} V \quad (11)$$

where V denotes the applied voltage of the primary coil. It is thus apparent that the output voltages $V_1$ and $V_2$ of the secondary coils 4 and 5 are proportional to the opposite $S_{g1}$ and $S_{g2}$, respectively. It is also apparent that when $N_1 = N_2$, $V_1 + V_2 =$ constant.

Since the opposing surfaces of the movable magnetic core 2 and the fixed magnetic core 1, which constitute the principal parts determining the displacement detection are arranged so as to hold the gaps 9 and 10 therebetween and not to be in contact with each other, the abrasion of the displacement detecting parts due to friction need not be considered. Assuming that the movable magnetic core 2 slides in close adherence to the central columnar part 6 of the fixed magnetic core 1, the abrasion due to the slide is unavoidable. However, when ferrite is used for the magnetic core, the abrasion is slight. In addition, even in the presence of the abrasion, if it is uniform, it will not affect the detection sensitivity in the first-order approximation as apparent from Equations (10) and (11). Furthermore, by making the contact area as large as is permissible in configuration, the abrasion of the contact part can be lessened. It is apparent from the foregoing that the gaps 9 and 10 at the displacement detecting parts are kept at substantially a constant width, so that the displacement - electricity transducer illustrated and described in this embodiment has a structure enduring repeated slides of several million times.

Although an explanation of the abrasion has been made in the case of sliding the movable magnetic core 2 where it is in close adherence to the central columnar part 6 of the fixed magnetic core 1, it is not always necessary to hold both the magnetic cores in close adherence during sliding. In some cases, it is possible to externally support both the magnetic cores 1 and 2 so as to define a slight spacing between the central columnar part 6 and the movable magnetic core 2, and to thus fully prevent the abrasion between both magnetic cores. In this case, the inductance of the primary coil 3 is held constant and that the output voltages of the secondary coils 4 and 5 are respectively proportional to the opposite areas $S_{g1}$ and $S_{g2}$.

Although the two secondary coils are provided in this embodiment, a single secondary coil may be provided.

Figure 2:
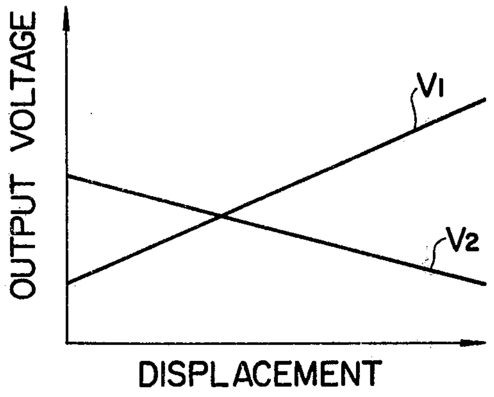
FIGS. 2 and 3 are characteristic curve diagrams of this embodiment.
Figure 3:
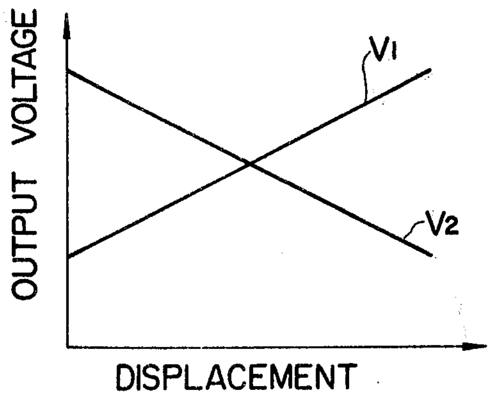

FIGS. 2 and 3 are characteristic curve diagrams of the output voltages versus the displacement of the movable magnetic core 2 at the time when, in the embodiment of FIG. 1, the number of turns of the secondary coils is $N_1 > N_2$ and $N_1 = N_2$, respectively. It is understood from these diagrams that the output voltages vary linearly relative to the displacement of the movable magnetic core 2.

Figure 4:
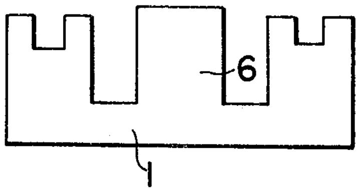
Figure 5:
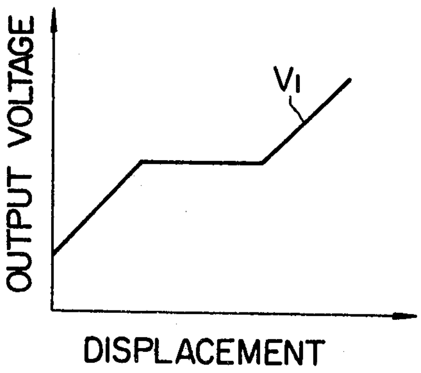
FIG. 5 is a characteristic curve diagram in the case where the modified magnetic core is substituted for the fixed magnetic core in the embodiment of FIG. 1.

When the fixed magnetic core 1 in the embodiment of FIG. 1 is formed into the configuration shown in FIG. 4, the output voltage-versus-displacement characteristic curve diagram becomes that shown in FIG. 5.

When the columnar parts at both ends of the fixed magnetic core 1 in the embodiment of FIG. 1 are shaped into triangles congruent with each other, the output voltages vary parabolically relative to the displacement. In this manner, the present invention also has the remarkable merit that a displacement - electricity transducer having any desired output voltage-versus-displacement characteristic is acquired merely by designing the geometrical shape of the pole-faces holding the gas therebetween.

In the embodiment shown in FIG. 1, the device with the power source removed is a kind of transformer. The coupling coefficient between the primary coil and the secondary coil varies in response to the displacement of the movable magnetic core. The impedance as viewed from both terminals of the primary coil is fixed in the state in which the secondary coil is open. The device can, accordingly, be called a complementary, variable coupling coefficient transformer. For the sake of simplicity, it will be hereinafter termed the variable transformer.

In embodiments to be explained hereunder, the same reference numerals are affixed to the same constituent parts as in FIG. 1, and the description of such parts is omitted.

Figure 6:
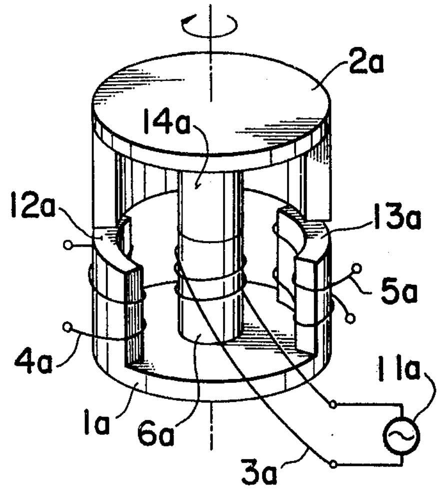
FIGS. 6, 7 and 8 are a sketch, a side view and a top view of another embodiment of the invention, respectively.
Figure 7:
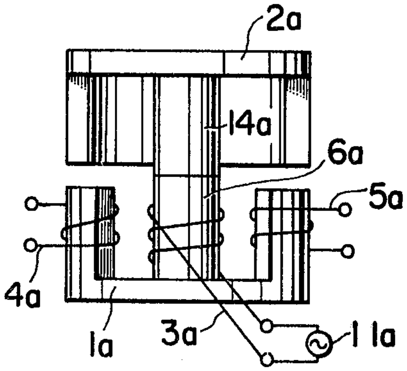
Figure 8:
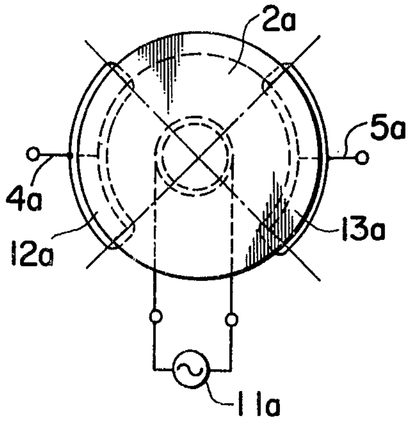

FIGS. 6, 7 and 8 are a sketch, a side view and a top view of another embodiment of the present invention, respectively. In this embodiment, parts common to the two magnetic paths are formed into circular cylindrical shafts 6*a* and 14*a* so that a fixed magnetic core 1*a* and a movable magnetic core 2*a* oppose each other. The opposing surfaces 12*a* and 13*a* of the fixed magnetic core 1*a* relative to the movable magnetic core 2*a* bordering the gap portions of the two magnetic paths have such a shape that, as shown in FIG. 8, each is surrounded by arcs of concentric circles of different radii and two straight lines passing through the center of the circles. The opposing surfaces are arranged at positions of symmetry of 180° rotation about the center. On the other hand, the opposing surface of the movable magnetic core 2*a* relative to the fixed magnetic core 1*a* bordering the gap portions has such a shape that is surrounded by semicircles concentric with the circles of the opposing surfaces 12*a* and 13*a*. The fixed magnetic core 1*a* and the movable magnetic core 2*a* can turn about the center relative to each other. In this case, the shafts 6*a* and 14*a* forming the common magnetic paths are brought into adherence as close as possible. Therefore, the magnetic reluctances of the two magnetic paths are chiefly determined by the substantial opposite areas between the opposing surfaces 12*a* and 13*a* of the fixed magnetic core 1*a* and the opposing surface of the movable magnetic core 2*a*, and the influence of the magnetic reluctance at the contact part of the shafts can be eliminated. However, some spacing must be provided between the shafts 6*a* and 14*a* in order to prevent abrasion. In this embodiment, the operating temperatures range from −40° C. to +120° C., and hence, a ferrite whose Curie temperature is 130° C. or higher is used as the material of the fixed magnetic core 1*a* and the movable magnetic core 2*a*. Of course, other materials of high permeability can be employed. As in the embodiment of FIG. 1, the characteristics of the terminal voltages of the secondary coils 4*a* and 5*a* versus the displacement of the movable magnetic core 2*a* become those shown in FIGS. 2 and 3.

Figure 9:
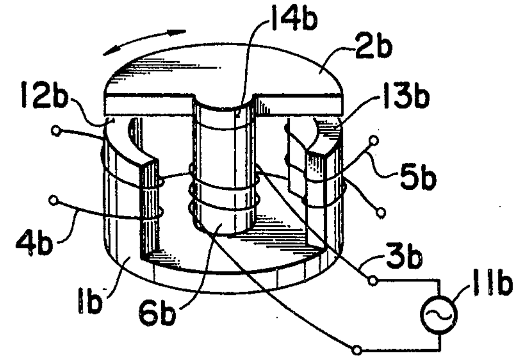
FIGS. 9 and 10 are a sketch and a side view of still another embodiment of the invention, respectively.
Figure 10:
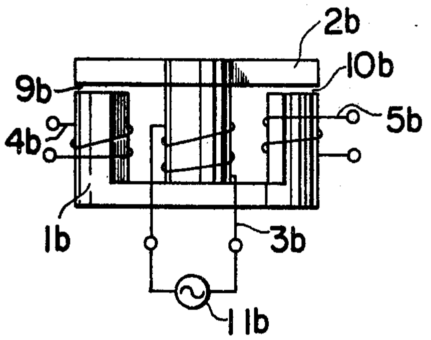

FIGS. 9 and 10 are a sketch and a side view showing still another embodiment of the present invention, respectively. By replacing the movable magnetic core 2*a* in FIG. 6 with a sectorial flat plate, the same characteristics as in FIGS. 2 and 3 are obtained. As will be understood from FIG. 9, the center part of the sectorial flat plate 2*b* is constructed into a shape to completely cover the circular cylindrical part 6*b* at the central part of the fixed magnetic core 1*b*. The upper surface of the circular cylindrical part 6*b* protrudes above the opposing surfaces 12*b* and 13*b* to the movable magnetic core 2*b*. When the movable magnetic core 2*b* is brought into close adherence to the circular cylindrical part 6*b*, equal gaps or clearances 9*b* and 10*b* are defined.

Figure 11:
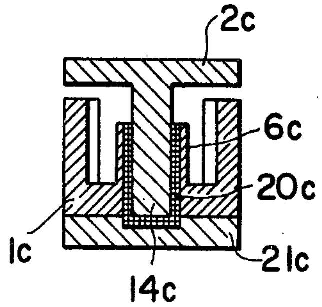
FIGS. 11 and 12 are sectional views each showing a modification of magnetic cores in the embodiment of FIGS. 9 and 10.
Figure 12:
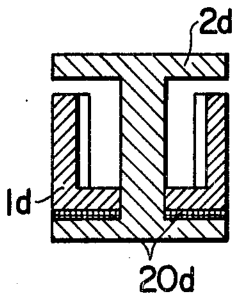

FIGS. 11 and 12 are sectional views of modifications of the magnetic cores shown in FIG. 9. The magnetic cores illustrated in FIG. 11 are formed so that the opposing surfaces between the central circular cylindrical part 14*c* of the movable magnetic core 2*c* and the circular cylindrical part 6*c* of the fixed magnetic core 1*c* may be wide. The magnetic core structure, accordingly, has the merit that the magnetic reluctance of the portion of the opposing surfaces is low. A spacer 20*c* made of a material such as Teflon is inserted into an interstice which is defined among a supporter 21*c* secured to the fixed magnetic core 1*c*, the fixed magnetic core 1*c* itself, and the central cylindrical part 14*c* of the movable magnetic core 2*c*. Thus, both the magnetic cores can move relative to each other. On the other hand, the magnetic core structure illustrated in FIG. 12 is composed of the movable magnetic core 2*d* and the fixed magnetic core 1*d* which are shaped like a hand-drum, and a spacer 20*d* which is made of Teflon or the like and which is inserted between both the magnetic cores. The opposing surfaces of the movable magnetic core 2*d* and the fixed magnetic core 1*d* at the portion for inserting the spacer are wide. Accordingly, as in the magnetic core structure in FIG. 11, this structure has the merit that the magnetic reluctance of the portion of the opposing surfaces is low.

Figure 13:
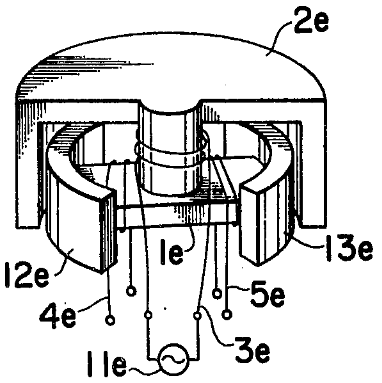
FIGS. 13 and 14 are a sketch and a top view of yet another embodiment of the invention, respectively.
Figure 14:
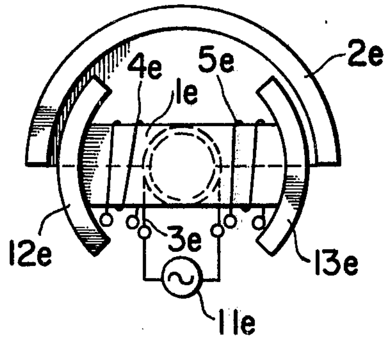

FIGS. 13 and 14 are a sketch and a bottom plan view showing yet another embodiment of the present invention, respectively. The opposing surfaces between the fixed magnetic core 1*e* and the movable magnetic core 2*e* are arranged on concentric cylinders having different radii. Thus, the characteristics in FIGS. 2 and 3 are obtained.

Figure 15:
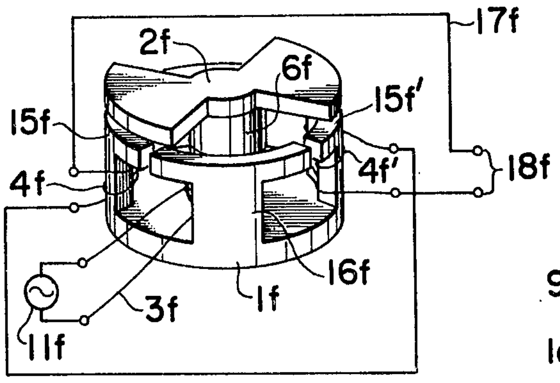
FIGS. 15, 16 and 17 are a sketch, a top view and a magnetic core-sectional view of a further embodiment of the invention, respectively.
Figure 16:
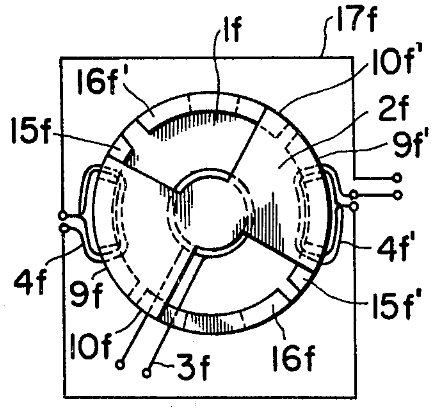
Figure 17:
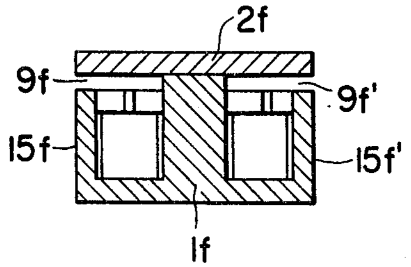

FIGS. 15, 16 and 17 are a sketch, a top view and a sectional side elevation of a further embodiment of the invention, respectively. The power source is omitted in FIG. 16, while the power source and the coils are omitted in FIG. 17. The displacement - electricity transducer of this embodiment has both the magnetic cores formed into such structure that, even in case where the transducer undergoes repeated strong vibrations as in an automobile and where a relative inclination consequently arises between the movable magnetic core and the fixed magnetic core, the impedance between the terminals of the primary coil is held constant and the output terminal voltage of the secondary coil does not fluctuate. In this embodiment, 1*f* and 2*f* indicate the fixed magnetic core and the movable magnetic core made of a high permeability material, respectively. Four magnetic circuits having gaps of a determined width are formed by both magnetic cores, and parts of the four magnetic paths are commonly formed at the central circular cylinder part 6*f* of the fixed magnetic core 1*f*. The movable magnetic core 2*f* turns in close adherence to the central circular cylinder part 6*f* of the fixed magnetic core 1*f* which is formed to be higher than the circumferential columnar parts 15*f*, 15'*f* and 16*f*, 16'*f* of the fixed magnetic core 1*f*. At this time, the gaps 9*f* and 10*f* between the movable magnetic core 2*f* and the circumferential columnar parts 15*f* and 16*f*, and the gaps 9'*f* and 10'*f* between the movable magnetic core 2*f* and the circumferential columnar parts 15'*f* and 16'*f* are held constant. The primary coil 3*f* is wound around the central circular cylinder part 6*f*, while the secondary coils 4*f* and 4'*f* are respectively wound around the circumferential columnar parts 15*f* and 15'*f*. In some cases, the secondary coils are also wound around the circumferential columnar parts 16*f* and 16'*f* in order to derive two outputs. The circumferential columnar parts 15*f*, 15'*f* and 16*f*, 16'*f* are congruent, and are arranged as illustrated in FIG. 16.

The gaps 9*f*, 9'*f* and 10*f*, 10'*f* are held at the determined value $g_0$ in the absence of an external force attributed to vibration, whereas they generally fluctuate in the presence of vibration. Let $g_1$, $g'_1$, $g_2$ and $g'_2$ denote the widths or clearances of the respective gaps 9*f*, 9'*f*, 10*f* and 10'*f*; $S_{g1}$ denote each of the substantial opposite areas between the circumferential columnar parts 15*f* and 15'*f* and the movable magnetic core 2*f*; $S_{g2}$ denote each of the substantial opposite areas between the circumferential columnar parts 16*f* and 16'*f* and the movable magnetic core; N denote the number of turns of the primary coil 3*f*; $N_0$ denote each of the number of turns of the secondary coils 4*f* and 4'*f*; and $\mu_0$ denote the magnetic permeability of the gaps. Then, the magnetic reluctances $R_{G1}$, $R'_{G1}$, $R_{G2}$ and $R'_{G2}$ of the magnetic cicuits respectively including the gaps 9*f*, 9'*f*, 10*f* and 10'*f* become, similarly to Equations (4) and (5), as follows:

$$R_{G1} \approx \frac{g_1}{\mu_0 S_{g1}} \qquad (12\text{-}1)$$

$$R'_{G1} \approx \frac{g'_1}{\mu_0 S_{g1}} \qquad (12\text{-}2)$$

$$R_{G2} \approx \frac{g_2}{\mu_0 S_{g2}} \qquad (12\text{-}3)$$

$$R'_{G2} \approx \frac{g'_2}{\mu_0 S_{g2}} \qquad (12\text{-}4)$$

Assuming that an increase $\Delta g_1$ takes place in the gap width on account of inclination due to the vibration, $$g_1 = g_0 + \Delta g_1 \qquad (13\text{-}1)$$

$$g'_1 = g_0 - \Delta g_1 \qquad (13\text{-}2)$$

$$g_2 = g_0 \qquad (13\text{-}3)$$

$$g'_2 = g_0 \qquad (13\text{-}4)$$

The magnetic reluctances therefore become:

$$R_{G1} \approx \frac{g_0\left(1 + \frac{\Delta g_1}{g_0}\right)}{\mu_0 S_{g1}} \qquad (14\text{-}1)$$

$$R'_{G1} \approx \frac{g_0\left(1 - \frac{\Delta g_1}{g_0}\right)}{\mu_0 S_{g1}} \qquad (14\text{-}2)$$

$$R_{G2} \approx \frac{g_0}{\mu_0 S_{g2}} \qquad (14\text{-}3)$$

-continued $$R'_{G2} \simeq \frac{g_0}{\mu_0 S_{g2}} \qquad (14\text{-}4)$$

Let it be supposed that increments $\Delta g_0$ and $\Delta g_1$ in the gap width are sufficiently small in comparison with the gap width $g_0$ at the time when no external force is exerted. Then, by the first-order approximation:

$$\frac{1}{R_{G1}} \simeq \frac{\mu_0 S_{g1}}{g_0}\left(1-\frac{\Delta g_1}{g_0}\right) \qquad (15\text{-}1)$$

$$\frac{1}{R'_{G1}} \simeq \frac{\mu_0 S_{g1}}{g_0}\left(1+\frac{\Delta g_1}{g_0}\right) \qquad (15\text{-}2)$$

$$\frac{1}{R_{G2}} \simeq \frac{\mu_0 S_{g2}}{g_0} \qquad (15\text{-}3)$$

$$\frac{1}{R'_{G2}} \simeq \frac{\mu_0 S_{g2}}{g_0} \qquad (15\text{-}4)$$

Both the magnetic cores are formed so that, even when the moveable magnetic core 2*f* is displaced relative to the fixed magnetic core 1*f*, $$S_{g1} + S_{g2} = S_g \qquad (16)$$

may always become constant.

The magnetic reluctance $R_G$ to which a magnetic flux interlinked with the primary coil 3*f* is subject is given by:

$$R_G = \frac{1}{\frac{1}{R_{G1}}+\frac{1}{R'_{G1}}+\frac{1}{R_{G2}}+\frac{1}{R'_{G2}}} \qquad (17)$$

Substituting Equations (15-1), (15-2), (15-3) and (15-4) into Equation (17), $$R_G \simeq \frac{1}{2\frac{\mu_0 S_{g1}}{g_0}+2\frac{\mu_0 S_{g2}}{g_0}} = \frac{g_0}{2\mu_0 S_g} \qquad (18)$$

Accordingly, similarly to Equation (7), the inductance L of the primary coil 3*f* becomes:

$$L = \frac{2\mu_0 N^2 S_g}{g_0} \qquad (19)$$

It is thus apparent that, even when a relative inclination occurs between the movable core 2*f* and the fixed magnetic core 1*f* on account of a vibration, the input impedance of the primary coil 3*f* is not affected by the first-order term of the increment $\Delta g_1$ due to inclination.

Letting I denote a current flowing through the primary coil 3*f*, magnetic fluxes $\Phi$ and $\Phi'$ passing through the respective gaps 9*f* and 9'*f* become, from Equations (15-1) and (15-2), as follows:

$$\Phi \simeq \frac{E_G}{R_{G1}} = NI\cdot\frac{\mu_0 S_{g1}}{g_0}\left(1-\frac{\Delta g_1}{g_0}\right) \qquad (20)$$

-continued $$\Phi' \simeq \frac{E_G}{R'_{G1}} = NI\cdot\frac{\mu_0 S_{g1}}{g_0}\left(1+\frac{\Delta g_1}{g_0}\right) \qquad (21)$$

where $E_g$ represents a magnetomotive force which is induced by the current I. The output voltages $V_1$ and $V'_1$ of the secondary coils 4*f* and 4'*f* having the number of turns $N_0$ become:

$$V_1 \simeq N_1\frac{d\Phi}{dt} = N_0 N\frac{\mu_0 S_{g1}}{g_0}\left(1-\frac{\Delta g_1}{g_0}\right)\frac{dI}{dt} \qquad (22)$$

$$V_2 = N_1\frac{d\Phi'}{dt} = N_0 N\frac{\mu_0 S_{g1}}{g_0}\left(1+\frac{\Delta g_1}{g_0}\right)\frac{dI}{dt} \qquad (23)$$

A lead wire 17*f* is connected so that the voltages $V_1$ and $V_2$ may be added in series. An output voltage V at an output terminal 18*f* accordingly becomes:

$$V = V_1 + V_2 = 2N_0 N\frac{\mu_0 S_{g1}}{g_0}\frac{dI}{dt} \qquad (24)$$

It is thus understood that, even when a relative inclination occurs between the movable magnetic core 2*f* and the fixed magnetic core 1*f* due to vibration, the output voltage V at the output terminal 18*f* is not affected by the first-order term of the increment $\Delta g_1$ due to inclination.

Figure 18:
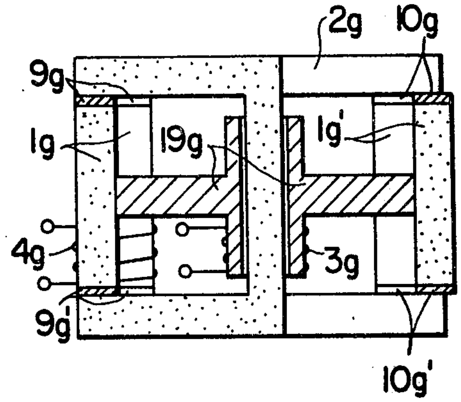
FIGS. 18 and 19 are a sectional view and a top view of a still further embodiment of the invention, respectively.
Figure 19:
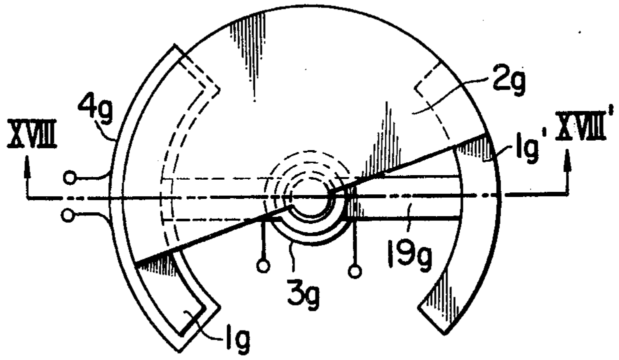

FIGS. 18 and 19 are a sectional side elevation and a top view of a still further embodiment, respectively. In the figures, the power source for applying the A.C. voltage to the terminals of the primary coil 3*g* is omitted. The movable core 2*g* and two fixed magnetic cores 1*g* and 1'*g* are made of a material of high permeability. The magnetic cores from two magnetic paths, which have respectively two gaps 9*g* and 9'*g* and 10*g* and 10'*g* with Teflon inserted therein. Shown at 19*g* is a member of a nonmagnetic material, which couples and fixes the fixed magnetic cores 1*g* and 1'*g*. The hand-drum-shaped movable magnetic core 2*g*, in which both sides of its cylinder part are formed to be semicircular, turns relative to the fixed magnetic cores 1*g* and 1'*g* while keeping the gap widths of the gaps 9*g*, 9'*g* and 10*g*, 10'*g* constant. The primary coil 3*g* is wound around the cylinder part of the hand-drum-shaped movable magnetic core 2*g*. The secondary coil 4*g* is wound around the fixed magnetic core 1*g*.

As in the embodiment shown in FIG. 15, this embodiment has the merit that even where the relative inclination appears between the movable magnetic core 2*g* and the fixed magnetic cores 1*g* and 1'*g* by reason of vibration, the impedance between the terminals of the primary coil 3*g* is held constant, the output terminal voltage of the secondary coil 4*g* being also held constant, and that even when a displacement in the vertical direction arises between both the magnetic cores, the impedance and the output terminal voltage are constant.

Where an external force due to the vibration is not exerted, the gaps 9*g* and 10*g* are held at a predetermined width $g_{01}$, and the gaps 9'*g* and 10'*g* at a predetermined width $g_{02}$. In general, however, the gap widths fluctuate in the presence of vibration.

Let $g_1$, $g'_1$, $g_2$ and $g'_2$ denote the widths of the respective gaps 9$g$, 9'$g$, 10$g$ and 10'$g$; $S_{g1}$ denote each of the substantial opposite areas of the gaps 9$g$ and 9'$g$ formed by the fixed magnetic core 1$g$ and the movable magnetic core 2$g$; $S_{g2}$ denote each of the substantial opposite areas of the gaps 10$g$ and 10'$g$ formed by the fixed magnetic core 1'$g$ and the movable magnetic core 2$g$; N denote the number of turns of the primary coil 3$g$; $N_0$ denote the number of turns of the secondary coil 4$g$; and $\mu_0$ denote the magnetic permeability of the gaps. Then, similarly to the derivation of Equations (4) and (5), the magnetic reluctance $R_{G1}$ of the magnetic circuit including the gaps 9$g$ and 9'$g$ becomes:

$$R_{G1} \simeq \frac{g_1}{\mu_0 S_{g1}} + \frac{g'_1}{\mu_0 S_{g1}} = \frac{g_1 + g'_1}{\mu_0 S_{g1}} \qquad (24\text{-}1)$$

while the magnetic reluctance $R_{G2}$ of the magnetic circuit including the gaps 10$g$ and 10'$g$ becomes:

$$R_{G2} \simeq \frac{g_2}{\mu_0 S_{g2}} + \frac{g'_2}{\mu_0 S_{g2}} = \frac{g_2 + g'_2}{\mu_0 S_{g2}} \qquad (24\text{-}2)$$

Assuming that an increase $\Delta g_0$ in the gap width takes place in the vertical direction on account of the vibration and that an increase $\Delta g_1$ in the gap width further takes place on account of the inclination, and putting $g_{01} + g_{02} = g_0$, $$g_1 = g_{01} + \Delta g_0 + \Delta G_1 \qquad (25\text{-}1)$$

$$g'_1 = g_{02} - \Delta g_0 - \Delta g_1 \qquad (25\text{-}2)$$

$$g_2 = g_{01} + \Delta g_0 + \Delta g_1 \qquad (25\text{-}3)$$

$$g'_2 = g_{02} - \Delta g_0 - \Delta g_1 \qquad (25\text{-}4)$$

Therefore, the magnetic reluctances become:

$$R_{G1} = \frac{g_o}{\mu_o S_{g1}} \qquad (26\text{-}1)$$

$$R_{G2} = \frac{g_o}{\mu_o S_{g2}} \qquad (26\text{-}2)$$

The magnetic cores are so formed that, even when the movable magnetic core 2$g$ is displaced relative to the fixed cores 1$g$ and 1'$g$, $$S_{g1} + S_{g2} = S_g$$

is always constant. In consequence, the magnetic reluctance $R_G$, to which a magnetic flux interlinked with the primary coil 3$g$ is subject, becomes (and it is not affected by $\Delta g_0$ and $\Delta g_1$):

$$R_G \simeq \frac{1}{\frac{1}{R_{G1}} + \frac{1}{R_{G2}}} = \frac{g_o}{\mu_0 (S_{g1} + S_{g2})} = \frac{g_0}{\mu_0 S_g} \qquad (27)$$

It is, accordingly, apparent that the inductance of the primary coil 3$g$ is not affected by vibration. Letting I denote a current flowing through the primary coil 3$g$, the output terminal voltage V of the secondary coil 4$g$ becomes:

$$V = N_0 \frac{d\left(\frac{\mu_0 S_{g1}}{g_0} N I\right)}{dt} = \frac{\mu_0 N N_0 S_{g1}}{g_0} \frac{dI}{dt} \qquad (28)$$

It is thus understood that the output terminal voltage V is free from the influence of vibrations.

As previously stated, teflon or the like material of low permeability is inserted into the gaps 9$g$, 9'$g$, 10$g$ and 10'$g$. Accordingly, the magnetic cores 1$g$ an 1'$g$ and the magnetic core 2$g$ are out of contact, and variations in the magnetic circuits, namely, variations in the inductance of the primary coil and the output voltage of the secondary coil attributed to the abrasion of the magnetic cores are preventable. Further, even when Teflon or the like material wears away, the inductance of the primary coil and the output voltage of the secondary coil are kept constant as apparent from the above explanation. Yet further, as is apparent from Equation (28), the output voltage is proportional to the opposite area $S_{g1}$.

In this embodiment, the magnetic cores are formed into such a structure that the movable magnetic core 2$g$ is supported by the Teflon bonded onto the respectively two pole-faces of the fixed magnetic cores 1$g$ and 1'$g$. However, they may also be formed into such a structure that Teflon is bonded onto the pole-faces on either the upper or lower side, while air gaps are defined on the other side, and that an external force is exerted so as to hold the Teflon between the movable magnetic core 2$g$ and the fixed magnetic cores 1$g$ and 1'$g$. Also, employable is such a structure that the gaps are air gaps and that the magnetic cores are externally supported.

The gaps in the foregoing embodiments may be air gaps or of any nonmagnetic material insofar as they are of a lower magnetic permeability than the magnetic cores. Accordingly, spacers of Teflon or the like may be inserted into the gaps in order to facilitate supporting the movable magnetic core by the fixed magnetic core. In some cases, very thin Teflon or the like is inserted into the contact part between the movable magnetic core and the fixed magnetic core in order to make small the coefficient or friction at the displacement of the movable magnetic core relative to the fixed magnetic core.

Description will now be made of another embodiment of the present invention constructed so that the angle $\phi_0$ of the output 0 (zero) in the output-versus-rotational angle characteristic can be arbitrarily set.

Figure 20:
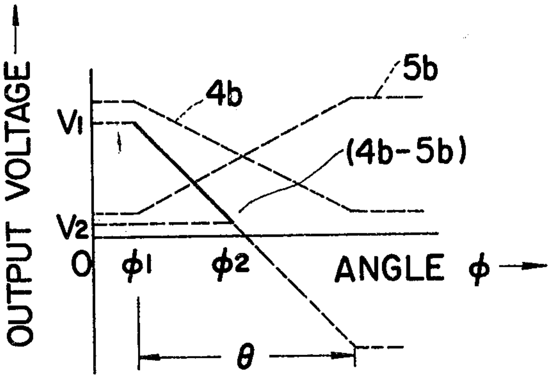
FIGS. 20, 21 and 22 are diagrams for explaining the output characteristics of a detector according to the present invention.

In order to obtain with the device of FIG. 9 an output characteristic in which, as shown by solid lines in FIG. 20, the output voltage is $V_1$ in an angular range of O–$\phi_1$ and it varies rectilinearly from $V_1$ to $V_2$ in an angular range of $\phi_1$–$\phi_2$, that is, the output characteristic given by:

$$V = \frac{\phi - \phi_2}{\phi_1 - \phi_2} V_1 + \frac{\phi - \phi_1}{\phi_2 - \phi_1} V_2$$

The angular range $\theta$, in which the output characteristics of the respective secondary coils of the device are rectilinear, must be as follows:

$$\theta \geqq \frac{2 V_1}{|V_1 - V_2|} (\phi_2 - \phi_1)$$

Accordingly, $\theta$ must be changed in conformity with required specifications for $V_1$, $V_2$, $\phi_1$ and $\phi_2$. Moreover, since $\theta$ is usually limited to less than 180°, $(\phi_2-\phi_1)$ equal to or greater than 90° cannot be realized.

The feature of this embodiment lies in utilizing the fact that, by arbitrarily selecting the turn ratio between the two secondary coils 4*b* and 5*b* of the device as shown in FIG. 9, the position of the output 0 can be arbitrarily set within the range of the rectilinear characteristic.

Figure 21:
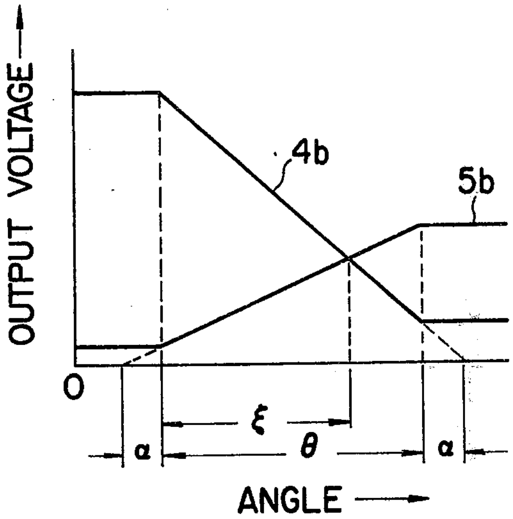

Now, let $p$ denote the turn ratio between the coils 4*b* and 5*b* in the device illustrated in FIG. 9. Then, the outputs across both the terminals of the respective secondary coils 4*b* and 5*b* vary as shown in FIG. 21 with the angle of rotation of the rotor 2*b*, and an angular range $\xi$ in which the difference between the outputs of both the secondary coils begins to decrease rectilinearly and finally becomes 0 is given by:

$$\xi = \frac{p^2 \theta + (p^2 - 1)\alpha}{p^2 + 1} \quad (29)$$

where $\alpha$ is a constant which is determined by the geometrical shapes and sizes of the rotor and the fixed magnetic core and the magnetic properties of the material thereof. As is apparent from Equation (29), $\xi$ can be arbitrarily set between 0 and $\theta$ by appropriately selecting $p$.

Figure 22:
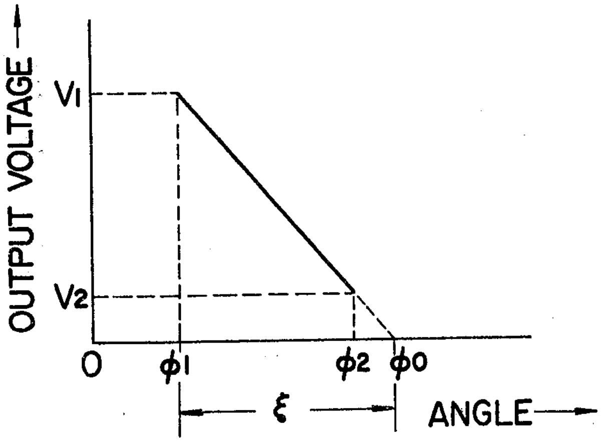

Here, let it be supposed that the desired rectilinear variation part of the output characteristic ranges from $\phi_1$ to $\phi_2$ as shown in FIG. 22 and that the desired outputs at $\phi_1$ and $\phi_2$ are $V_1$ and $V_2$, respectively. Then, a point $\phi_0$ at which the extension of the rectilinear part intersects the abscissa is given by:

$$\phi_0 = \frac{V_1 \phi_2 - V_2 \phi_1}{V_1 - V_2}$$

Accordingly, by appropriately selecting the turn ratio $p$ between the coil 4*b* and the coil 5*b*, it is possible to make:

$$\xi = \phi_0 - \phi_1$$

It is apparent that outputs $V_1'$ and $V_2'$ at the respective angles $\phi_1$ and $\phi_2$ in the case of deciding the turn ratio in this way hold the following relation therebetween:

$$\frac{V_1'}{V_2'} = \frac{V_1}{V_2}$$

Consequently, when the input voltage to the primary coil 3*b* is decided, the desired output characteristic can be acquired by appropriately selecting the turn ratio of the primary coil to the secondary coil. Thus, according to the present invention, if $(\phi_2-\phi_1)$ is smaller than $\xi$, the desired rectilinear output characteristic can be attained by appropriately selecting the turn ratio between the two secondary coils and the turn ratios between the secondary coils and the primary coil and without specially changing the configurations of the rotor, the fixed magnetic core, etc.

Figure 23:
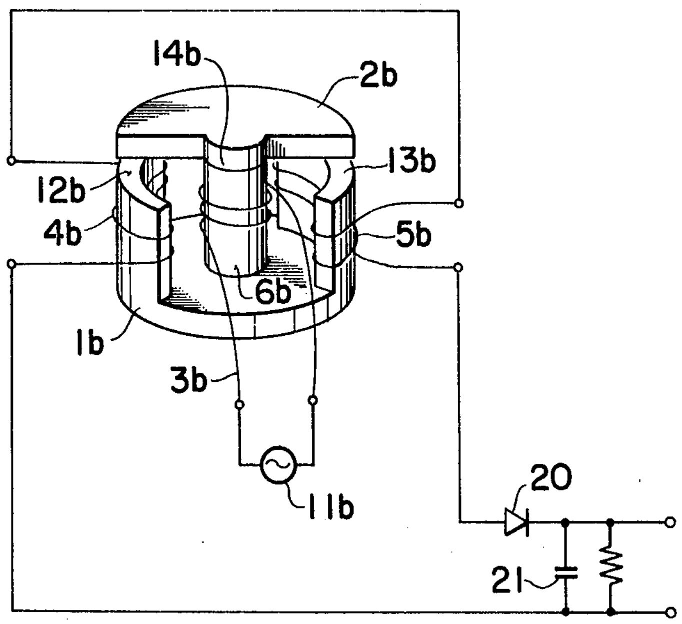

FIG. 23 shows a concrete construction of this embodiment. The top 14*b* of the central protrusive part 6*b* and the tops 12*b* and 13*b* of the outer-peripheral protrusive parts of the fixed magnetic core 1*b* are flush, so that the rotor 2*b* can rotate in close adherence to the surfaces 14*b*, 12*b* and 13*b*. An angle $\theta$ by which each of the outer-peripheral protrusive parts of the fixed magnetic core 1*b* spreads when viewed from the center is 90°. The angular range in which the coefficient of the mutual induction between the coils 4*b* and 5*b* wound around the outer-peripheral protrusive parts and the coil 3*b* wound around the central protrusive part 6*b* varies rectilinearly relative to the rotational angle of the rotor is about 90°. The number of turns $N_1$ of the primary coil 3*b* is 8 turns, and the number of turns $N_2$ of one 4*b* of the secondary coils is 12 turns. The number of turns $N_2'$ of the other secondary coil 5*b* was changed to be 12, 10, 8, 6, 4, 2 and 0 turns. Further, the A.C. power source 11*b* is coupled to the coil 3*b*. The coils 4*b* and 5*b* are connected as in the figure so as to differentially operate. A voltage appearing across both the terminals of the secondary coils is rectified by a diode 20 and smoothed by a capacitor 21.

Figure 24:
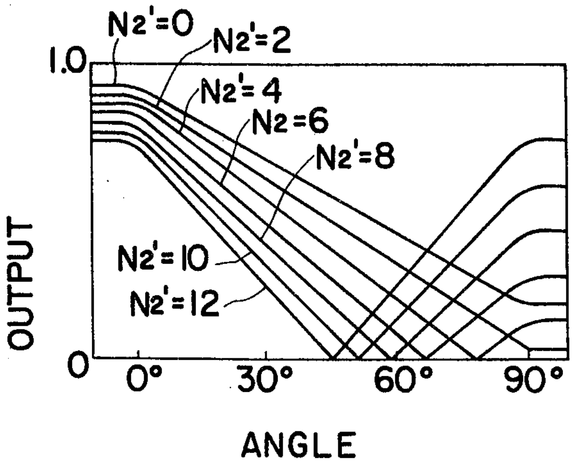
FIG. 24 is a diagram of the output characteristics of the device in FIG. 23.

The output characteristics of the device are shown in FIG. 24. As is apparent from the figure, the angle $\phi_0$ at which the output becomes 0 (zero) can be set substantially arbitrarily in a range of 45°– 90° by variously selecting the turn ratio between the two secondary coils. It is apparent that, in order to set the angle $\phi_0$ in a range of 0°– 45°, the ratios between the numbers of turns $N_2$ and $N_2'$ may be selected to be converse to the foregoing. It is accordingly understood that the angle $\phi_0$ of the output 0 can be arbitrarily set in the range of 0°–90° by the selection of the turn ratio. As previously stated, if the angle $\phi_0$ of the output 0 is set at the desired value in this manner and the output at 0° is set at the desired value by appropriately selecting the turn ratio between the primary coil and the secondary coil with respect to the supply voltage, the desired output characteristics rectilinearly varying between 0° and $\phi_0$ will be achieved.

Likewise, in the embodiments of FIG. 1, FIG. 6 and FIG. 13, the angle $\phi_0$ at which the output becomes 0 can be arbitrarily chosen by appropriately selecting the turn ratio between the primary and secondary coils.

There will now be explained a power circuit in the displacement detector as set forth above.

In general, an oscillator constituting a power circuit is composed of active elements (transistor, complementary type insulated gate field-effect transistor, etc.) and passive elements (diode, capacitor, resistance). Therefore, where the oscillator is used in a place attended with a wide range of temperature changes, temperature compensation is usually provided.

As to conventional oscillators, it is known that where the amplification degree increases with the temperature rise, the output generally decreases. Accordingly, in order to stabilize the oscillation output against the temperature change, the oscillator may be operated in the direction in which the feedback ratio decreases with the temperature rise. A transistorized Colpitts oscillator is a known oscillation circuit. In order to effect the stable operation against the wide range of temperature changes, a feedback resistance has been contemplated which can easily alter the feedback ratio with the temperature rise. In the power circuit according to this embodiment, the oscillation amplitude is stabilized by the use of a negative temperature coefficient-resistance element whose resistance value decreases with a temperature increase. In addition, a dispersion in the coefficients of the negative temperature coefficient-resistance elements is compensated by combining auxiliary resistances.

Figure 25:
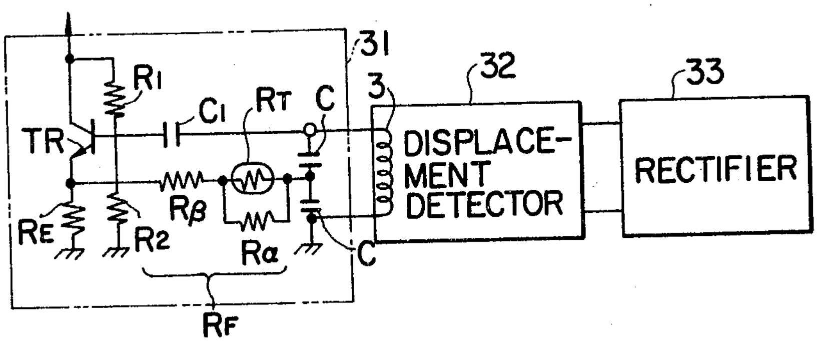
FIG. 25 is a diagram showing an example of a power source circuit in the detector according to the present invention.

FIG. 25 shows a concrete example of the circuit, in which TR denotes a transistor, $R_1$ and $R_2$ base bias resistances, $R_E$ an emitter resistance, $R_F$ a feedback resistance, $C_1$ a D.C. eliminating capacitor, and C a capacitor for resonance.

The oscillation circuit includes a tank circuit of the capacitors C and the primary coil 3 of a displacement detector 32, and oscillates at a frequency given by:

$$f = \frac{\sqrt{2}}{2\pi\sqrt{LC}}$$

where L denotes the inductance of the coil 3.

This embodiment is characterized in that fixed resistances $R_\alpha$ and $R_\beta$ and a temperature-dependent resistance, such as thermistor $R_T$, are employed for the feedback resistance $R_F$, so as to vary the feedback ratio in response to changes in ambient temperature.

Figure 26:
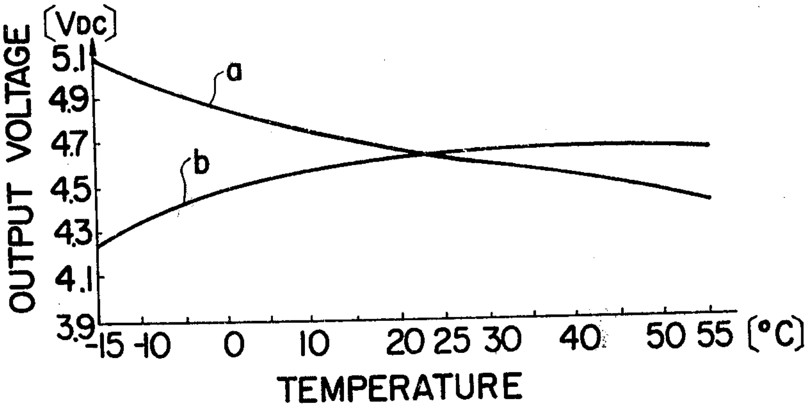
FIG. 26 is a diagram of the output voltage-versus-temperature characteristics of a prior-art circuit and the circuit in FIG. 25.

As a result, whereas the output of the oscillator 31 varies at a curve *a* in FIG. 26 relative to the temperature change in the absence of the temperature compensation, it can invert the temperature coefficient as at a curve *b* in the presence of the temperature compensation as in the circuit of FIG. 25.

Further, by the way of the combination of the auxiliary resistances, the feedback resistance having an optimum temperature coefficient can be readily selected. An improvement of one or more orders over the above example is made very easily.

Figure 27:
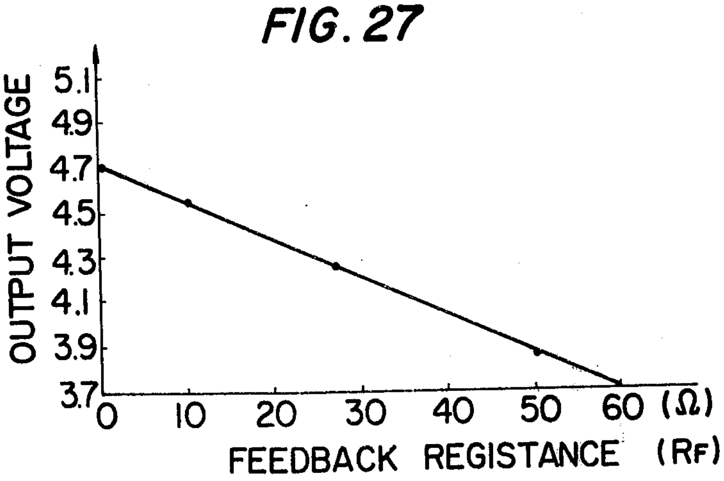
FIG. 27 is a diagram of the output voltage-versus-feedback resistance characteristic of the circuit in FIG. 25.

FIG. 27 shows the oscillation output level versus the feedback resistance. As seen from this figure, the D.C. output level can be easily altered by only the circuit part without adjusting the displacement detector portion 32.

While we have shown and described several embodiments in accordance with the present invention it is understood that the same is not limited thereto but is susceptible of numerous changes and modifications known to a person skilled in the art and we therefore do not wish to be limited to the details shown and described herein but intend to cover all such changes and modifications as are obvious to one of ordinary skill in the art.

What is claimed is:

1. A displacement-electricity transducer comprising:

a movable magnetic core and a fixed magnetic core which are oppositely arranged so as to have predetermined gaps between at least two oppositely disposed portions of said respective magnetic cores, both said magnetic cores forming substantially two closed magnetic circuits, each circuit including one of said gaps and a common magnetic path portion, said movable magnetic core and said fixed magnetic core being more closely coupled at said common path portion than at said gaps, wherein upon displacement of said movable magnetic core relative to said fixed magnetic core, the area of common projection between opposing portions of said magnetic cores having one of said gaps therebetween in one of said closed magnetic circuits increases, while the area of common projection between opposing portions of said magnetic cores having the other of said gaps therebetween in the other closed magnetic circuit decreases;

a first coil which is wound around the common magnetic path portion of said two closed magnetic circuits;

at least one second coil which is wound around a portion other than said common magnetic path portion in at least one of said closed magnetic circuits; and an A.C. power source for applying an A.C. voltage to said first coil.

2. A displacement-electricity transducer comprising:

a fixed magnetic core having a central leg portion and leg portions provided on both sides thereof magnetically coupled to each other;

a movable magnetic core which is displaced in contact with said central leg portion, so that said magnetic cores are closely coupled at said central leg portion, said movable magnetic core having at least two surface portions with predetermined gaps relative to said leg portions on said both sides, and said movable magnetic core being arranged such that upon displacement thereof the projection area of one of said surface portions onto said leg portion on one of said sides increases, and the projection area of the other of said surface portions onto said leg portion on the other side decreases;

a first coil which is wound around said central leg portion in said fixed magnetic core;

at least one second coil which is wound around at least one of both side leg portions; and an A.C. power source for applying an A.C. voltage to said first coil.

3. A displacement - electricity transducer according to claim 2, wherein a concave cut-out portion is provided in that surface of each of said leg portions which oppose said movable magnetic core.

4. A displacement - electricity transducer comprising:

a circular-shaped plate of magnetic material;

a cylindrical shaft of magnetic material extending from the center of one surface of said circular-shaped plate;

first and second arcuate-shaped wall members extending vertically from respective portions of said one surface of said circular shaped plate, and symmetrically disposed relative to said cylindrical shaft;

an upper plate member mounted on said shaft for rotation therewith and having respective portions thereof separated from said arcuate-shaped wall members by a prescribed gap therebetween;

a first coil wound around said cylindrical shaft;

at least one second coil wound around a respective arcuate-shaped wall member; and a power source for supplying an A.C. voltage to said first coil.

5. A displacement - electricity transducer according to claim 4, wherein said upper plate member comprises a semicircular-shaped flat plate.

6. A displacement - electricity transducer according to claim 4, wherein said upper plate member includes a circularly-shaped flat plate and a third arcuate-shaped wall member extending vertically from the surface of said flat plate facing said first and second wall members and separated therefrom by said predetermined gap.

7. A displacement - electricity transducer comprising:

a circular-shaped plate of magnetic material having an aperture through the center of said plate;

first and second arcuate-shaped wall members of magnetic material extending vertically from respective portions of one surface of said circular-shaped plate and symmetrically disposed relative to said aperture;

a bearing member fitted into said aperture of said plate;

a semicircular-shaped plate of magnetic material;

a cylindrical shaft of magnetic material extending from said semicircular-shaped plate and being received by said bearing member for permitting rotation of said semicircular-shaped plate relative to said first and second wall members while maintaining said semicircular-shaped plate spaced from said wall members by a predetermined gap;

a first coil wound around said bearing member;

at least one second coil wound around a respective wall member; and a power source for supplying an A.C. voltage to said first coil.

8. A displacement - electricity transducer according to claim 7, further including a support affixed to said circular-shaped plate and having a recess for receiving one end of said bearing member.

9. A displacement - electricity transducer comprising:

a circular-shaped plate of magnetic material having an aperture through the center of said plate;

first and second arcuate-shaped wall members of magnetic material extending vertically from respective portions of one surface of said circular-shaped plate and symmetrically disposed relative to said aperture;

a cylindrical shaft of magnetic material snugly and rotatably fitting into said aperture;

a semicircular-shaped plate of magnetic material mounted on one end of said cylindrical shaft so as to be spaced apart from said first and second wall members by a predetermined gap therebetween;

a first coil wound around said shaft;

at least one second coil wound around a respective wall member; and a power source for supplying an A.C. voltage to said first coil.

10. A displacement - electricity transducer according to claim 9, further including a spacer member having an aperture therethrough through which said shaft passes disposed on one surface of said circular shaped plate and a further plate mounted on another end of said shaft adjacent said spacer member.

11. A displacement - electricity transducer comprising:

a first plate of magnetic material having an aperture therethrough;

first and second arcuate-shaped wall members of magnetic material affixed to opposite ends of said first plate in opposite sides of said aperture;

a cylindrical shaft of magnetic material snugly and rotatably fitting into said aperture;

a semicircular plate member of magnetic material mounted on one end of said shaft so as to be rotatable relative to said wall members but spaced apart therefrom by a prescribed gap;

a first coil wound around said shaft;

at least one second coil wound around at least one respective portion of said first plate; and a power source for supplying an A.C. voltage to said first coil.

12. A displacement - electricity transducer according to claim 11, where said semicircular plate member comprises a semicircular plate and a third arcuate-shaped wall member extending vertically from the surface of said plate so as to be displaced radially from said first and second wall members relative to the axis of said shaft.

13. A displacement - electricity transducer comprising:

a movable magnetic core and a fixed magnetic core which are oppositely arranged so as to have predetermined gaps between at least four oppositely disposed surfaces of said respective magnetic cores, both said magnetic cores forming substantially two pairs of closed magnetic circuits each including one of said gaps and a common magnetic path portion, said magnetic cores being more closely coupled to said common path portion than at said gaps, wherein upon displacement of said movable magnetic core relative to said fixed magnetic core the area of common projection between opposite surfaces of said magnetic cores increases in one of said pairs of magnetic circuits and decreases in the other pair of magnetic circuits;

a first coil which is wound around the common magnetic path portion of the four closed magnetic circuits;

second coils which are respectively wound around portions other than said common magnetic path portion, in at least one of said pairs of closed magnetic circuits; and an A.C. power source for applying an A.C. voltage to said first coil.

14. A displacement - electricity transducer comprising:

a circular-shaped plate of magnetic material, a plurality of arcuate-shaped wall members of magnetic material extending from the surface of said circular-shaped plate and being angularly equally spaced relative to one another about the center of said plate, each wall member having a relatively narrow circumferential portion extending from the surface of said plate and a relatively wide circumferential portion extending from said relatively narrow circumferential portion;

a cylindrical shaft member extending from the center of said plate;

a further plate of magnetic material mounted on one end of said shaft and having a plurality of radially extending arc portions which are angularly equally spaced relative to one another about the axis of said shaft and are rotatably displaceable relative to and spaced apart from the relatively wide circumferential portions of said wall members by a prescribed gap therebetween;

a first coil wound around said shaft;

at least one second coil wound around at least one respective wall member; and an A.C. power source for supplying an A.C. voltage to said first coil.

15. A displacement - electricity transducer comprising:

a first magnetic core having two semicircular plates and a supporter for joining said plates at a center of a circular arc thereof and for supporting said plates in parallel formed into a single magnetic core;

second and third magnetic cores which are arranged so that their pole-faces respectively oppose two parts lying at positions diagonal to each other within a plane surrounded by two straight lines passing through a center of said supporter and by two circular arcs around said center of said supporter and with different radii;

a supporter which fixedly couples said second and third magnetic cores and which is made of a non-magnetic material;

said first to third magnetic cores forming substantially two magnetic circuits each including two gaps; and first and second coils which are respectively wound around a part common to the two magnetic paths and a part not common thereto;

said transducer being so constructed that said first magnetic core is rotatable relative to a fourth magnetic core around the center of said first magnetic core and in a manner to maintain the widths of the gaps constant; and an A.C. supply source for applying a voltage to terminals at both ends of said first coil, while a terminal voltage is derived from said second coil.

16. A displacement - electricity transducer comprising:

a movable magnetic core and a fixed magnetic core which are oppositely arranged so as to have predetermined gaps in at least two places therebetween, both said magnetic cores forming substantially two closed magnetic circuits, each circuit including one of said gaps and a common magnetic path, so that upon the displacement of said movable magnetic core relative to said fixed magnetic core, the area of common projection of said magnetic cores having one of said gaps therebetween in one of said closed magnetic circuits increases, while the area of common projection of said magnetic cores having the other of said gaps therebetween in the other closed magnetic circuit decreases;

a first coil which is wound around the common magnetic path portion of said two closed magnetic circuits;

at least one second coil which is wound around a portion other than said common magnetic path portion in at least one of said closed magnetic circuits, an A.C. power source for applying an A.C. voltage to said first coil; and wherein a plurality of second coils are respectively wound around portions other than said common magnetic path portion in said two closed magnetic circuits and are connected in series to form an output coil, and wherein the turn ratio between said plurality of second coils is selected to provide an output voltage from said output coil of zero at an arbitrarily predetermined rotational angle of said movable core.

17. A displacement - electricity transducer comprising:

a movable magnetic core and a fixed magnetic core which are oppositely arranged so as to have predetermined gaps in at least two places therebetween, both said magnetic cores forming substantially two closed magnetic circuits, each circuit including one of said gaps and a common magnetic path, so that upon the displacement of said movable magnetic core relative to said fixed magnetic core, the area of common projection of said magnetic cores having one of said gaps therebetween in one of said closed magnetic circuits increases, while the area of common projection of said magnetic cores having the other of said gaps therebetween in the other closed magnetic circuit decreases;

a first coil which is wound around the common magnetic path portion of said two closed magnetic circuits;

at least one second coil which is wound around a portion other than said common magnetic path portion in at least one of said closed magnetic circuits;

an A.C. power source for applying an A.C. voltage to said first coil;

wherein said A.C. power source includes an oscillator having a negative temperature coefficient-resistance element in a feedback path, said oscillator including said first coil, and said negative temperature coefficient-resistance element effecting temperature compensation by varying the feedback ratio of said oscillator in response to a temperature change.

18. A displacement - electricity transducer comprising:

a movable magnetic core and a fixed magnetic core which are oppositely arranged with contacting areas so as to form substantially two closed magnetic circuits including a common magnetic path portion, wherein upon displacement of said movable magnetic core relative to said fixed magnetic core, the contact area between said magnetic cores in one of said closed magnetic circuits increases, while the contact area between said magnetic cores in the other closed magnetic circuit decreases;

a first coil which is wound around the common magnetic path portion of said two closed magnetic circuits;

at least one second coil which is wound around a portion other than said common magnetic path portion, in at least one of said closed magnetic circuits; and an A.C. power source for applying an A.C. voltage to said first coil.

19. A displacement - electricity transducer according to claim 1, wherein said oppositely disposed portions of said respective magnetic cores include surfaces of at least one of said magnetic cores.

20. A displacement - electricity transducer according to claim 19, wherein at least one of said surfaces is a flat surface.

21. A displacement - electricity transducer according to claim 20, wherein said oppositely disposed portions of both of said magnetic cores include said flat surfaces.

22. A displacement - electricity transducer according to claim 21, wherein said flat surfaces of at least one of said magnetic cores are wall edge surfaces of said one magnetic core.

23. A displacement - electricity transducer according to claim 19, wherein said surfaces of at least one magnetic core are curved surfaces.

24. A displacement - electricity transducer according to claim 23, wherein said curved surfaces are arcuate wall surfaces of said at least one magnetic core.

25. A displacement - electricity transducer according to claim 24, where both of said magnetic cores having said arcuate wall surfaces with said arcuate surfaces of respective magnetic cores being concentrically disposed.

26. A displacement - electricity transducer according to claim 1, wherein said oppositely disposed portions of said respective magnetic cores include surfaces of both said magnetic cores, and wherein upon displacement of said movable magnetic core relative to said fixed magnetic core the sum of the opposing surface areas is maintained constant.

27. A displacement - electricity transducer according to claim 26, wherein means are provided for linearly moving said movable magnetic core relative to said fixed magnetic core.

28. A displacement - electricity transducer according to claim 26, wherein means are provided for rotatably moving said movable magnetic core relative to said fixed magnetic core.

29. A displacement - electricity transducer according to claim 28, wherein said means for rotatably moving said moving said movable magnetic core includes shaft means mounted for rotating said movable magnetic core relative to said fixed magnetic core about an axis parallel to said common path portion.

30. A displacement - electricity transducer according to claim 29, wherein said shaft means constitutes said common path portion and is of a magnetic material.

31. A displacement - electricity transducer according to claim 29, wherein said fixed magnetic core includes a circular plate or magnetic material having a plurality of arcuate wall members extending from one surface of said circular plate toward said movable magnetic core with said predetermined gaps therebetween, said movable magnetic core being mounted for rotation with said shaft means relative to said arcuate wall members.

32. A displacement - electricity transducer according to claim 31, wherein said movable magnetic core includes a second circular plate of magnetic material having a further arcuate wall member extending from one surface of said second plate toward said arcuate wall members of said fixed magnetic core, and being separated therefrom by said predetermined gaps.

33. A displacement - electricity transducer according to claim 32, wherein said further arcuate wall member of said movable magnetic core is semicircularly concentric with said shaft means, and wherein said plurality of arcuate wall members of said fixed magnetic core include two separate arcuate wall members symmetrically disposed relative to said shaft means.

34. A displacement - electricity transducer according to claim 33, wherein a plurality of second coils are respectively portions other than said common magnetic path portion in said two closed magnetic circuits and are connected in series to form an output coil, and wherein the turn ratio between said plurality of second coils is selected to provide an output voltage of zero at an arbitrarily predetermined rotational angle of said movable magnetic core.

35. A displacement - electricity transducer according to claim 31, wherein said movable magnetic core includes a semicircular flat plate of magnetic material having one flat surface separated from said plurality of arcuate wall members by said predetermined gaps.

36. A displacement - electricity transducer according to claim 34, wherein said shaft means supports said flat semicircular plate separated from said plurality of arcuate wall members at said predetermined gaps.

37. A displacement - electricity transducer according to claim 35, wherein a plurality of second coils are respectively portions other than said common magnetic path portion in said two closed magnetic circuits and are connected in series to form an output coil, and wherein the turn ratio between said plurality of second coils is selected to provide an output voltage of zero at an arbitrarily predetermined rotational angle of said movable magnetic core.

38. A displacement - electricity transducer according to claim 35, wherein said A.C. power source includes an oscillator having a negative temperature coefficient-resistance element in a feedback path, said oscillator including said first coil, and said negative temperature coefficient-resistance element effecting temperature compensation by varying the feedback ratio of said oscillator in response to a temperature change.

39. A displacement - electricity transducer according to claim 35, wherein said fixed magnetic core includes a bearing means for supporting said shaft means at the center of said circular plate.

40. A displacement - electricity transducer according to claim 39, wherein said bearing means includes a hollow member at an aperture of said circular plate of fixed magnetic core through which said shaft means extends, a supporting plate secured to said circular plate at a surface opposite to said movable magnetic core, and a bearing material between said shaft means and said hollow member and between an end of said shaft means and said supporting plate.

41. A displacement - electricity transducer according to claim 39, wherein said bearing means includes an aperture of said circular plate of said fixed magnetic core through which said shaft means extends, a bearing plate mounted on an end of said shaft means opposite to said semicircular plate from said circular plate, and bearing material between said bearing plate and said circular plate.

42. A displacement - electricity transducer according to claim 31, wherein said movable magnetic core includes a semicircular flat plate and a further arcuate wall member extending from one surface of said semicircular plate in the direction of said fixed magnetic core, said further arcuate wall member being semicircularly concentric with said shaft means and being disposed radially outwardly from said plurality of arcuate wall members of said fixed magnetic core relative to said shaft means.

43. A displacement - electricity transducer according to claim 42, wherein said plurality of arcuate wall members of said fixed magnetic core include two separate arcuate wall members symmetrically disposed relative to said shaft means.

44. A displacement - electricity transducer according to claim 42, wherein a plurality of second coils are respectively portions other than said common magnetic path portion in said two closed magnetic circuits and are connected in series to form an output coil, and wherein the turn ratio between said plurality of second coils is selected to provide an output voltage of zero at an arbitrarily predetermined rotational angle of said movable magnetic core.

45. A displacement - electricity transducer according to claim 42, wherein said A.C. power source includes an oscillator having a negative temperature coefficient-resistance element in a feedback path, said oscillator including said first coil, and said negative temperature coefficient-resistance element effecting temperature compensation by varying the feedback ratio of said oscillator in response to a temperature change.

46. A displacement - electricity transducer according to claim 31, wherein said movable magnetic core includes a plate of magnetic material having a plurality of arc portions radially extending from said shaft means, said radial arc portions being angularly equally spaced relative to one another about said axis of rotation, and said radical arc portions being separated from said plurality of arcuate wall members by said predetermined gaps.

47. A displacement - electricity transducer according to claim 46, wherein said plurality of arcuate wall members of said fixed magnetic core are equally angularly spaced relative to one another about said axis, and wherein each wall member has a relatively narrow circumferential portion extending from said one surface of said circular plate and a relatively wide circumferential portion extending from said relatively narrow circumferential portion, said radial arc portions of said movable magnetic core being rotatably displaced relative to said relatively wide circumferential portions of said plurality of wall members.

48. A displacement - electricity transducer according to claim 47, wherein a plurality of second coils are respectively portions other than said common magnetic path portion in said two closed magnetic circuits and are connected in series to form an output coil, and wherein the turn ratio between said plurality of second coils is selected to provide an output voltage of zero at an arbitrarily predetermined rotational angle of said movable magnetic core.

49. A displacement - electricity transducer according to claim 47, wherein said A.C. power source includes an oscillator having a negative temperature coefficient-resistance element in a feedback path, said oscillator including said first coil, and said negative temperature coefficient-resistance element effecting temperature compensation by varying the feedback ratio of said oscillator in response to a temperature change.

50. A displacement - electricity transducer according to claim 29, wherein said fixed magnetic core includes two separate arcuate magnetic core members coupled by a non-magnetic supporter at radially opposite sides of said shaft means, said non-magnetic supporter having means for supporting said shaft means for rotation, and wherein said relatively movable magnetic core includes two parallel semicircular plates supported by said shaft means at said predetermined gaps from edge surfaces of each of said two arcuate magnetic core members, such that said two magnetic circuits are formed through respective ones of said two arcuate magnetic core members and respective ones of said predetermined gaps between each semicircular plate and said edge surfaces of each arcuate magnetic core members.

51. A displacement - electricity transducer according to claim 50, where non-magnetic spacers are arranged at each of said predetermined gaps between respective parallel semicircular plates and said edge surfaces of each of said two arcuate magnetic core members.

52. A displacement - electricity transducer according to claim 50, wherein a plurality of second coils are respectively portions other than said common magnetic path portion in said two closed magnetic circuits and are connected in series to form an output coil, and wherein the turn ratio between said plurality of second coils is selected to provide an output voltage of zero at an arbitrarily predetermined rotational angle of said movable magnetic core.

53. A displacement - electricity transducer according to claim 50, wherein said A.C. power source includes an oscillator having a negative temperature coefficient-resistance element in a feedback path, said oscillator including said first coil, and said negative temperature coefficient-resistance element effecting temperature compensation by varying the feedback ratio of said oscillator in response to a temperature change.

* * * * *